United States Patent Office 3,121,038
Patented Feb. 11, 1964

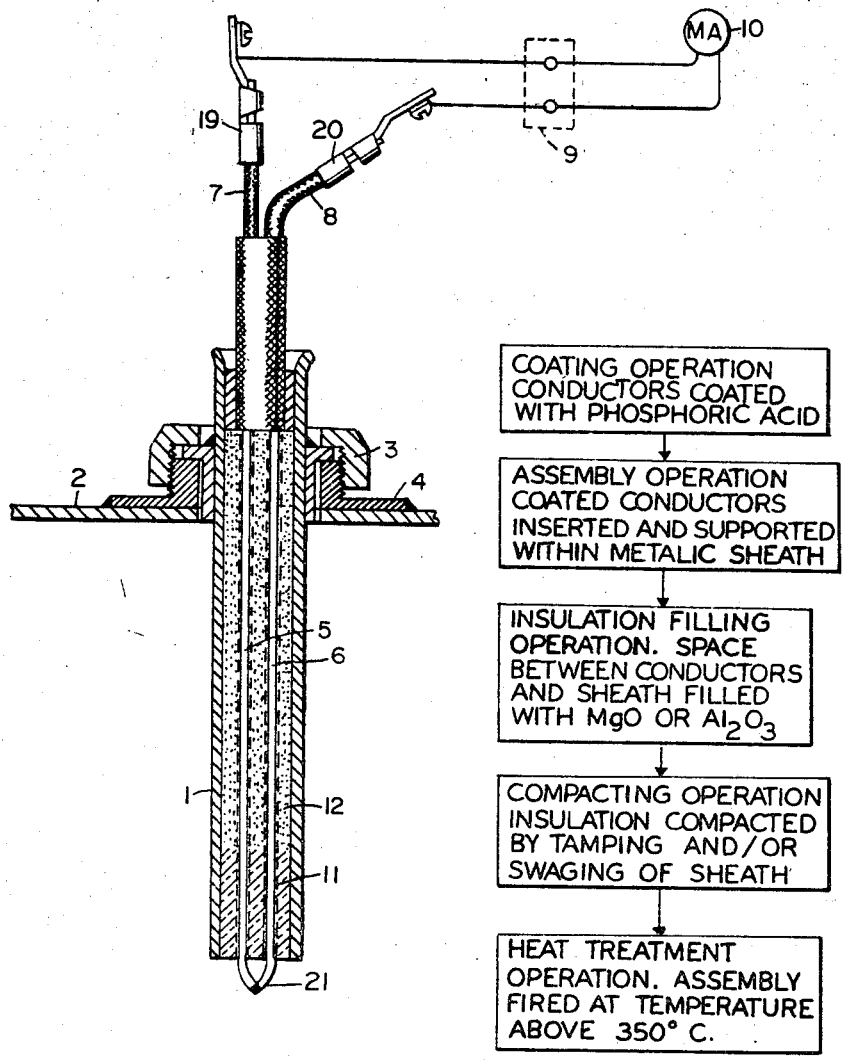

3,121,038
METHOD OF PROVIDING A HIGH RESISTANCE INSULATION COATING FOR A CONDUCTOR IN A SHEATH
Laurence F. Perotte, Arlington, Mass., assignor to General Electric Company, a corporation of New York
Filed June 1, 1960, Ser. No. 33,244
6 Claims. (Cl. 156—48)

This invention relates to sealed thermocouples and more particularly to improved insulation of the thermoelements enabling operation at elevated temperatures under adverse conditions.

Measurements of temperatures within high temperature power plants, such as aircraft gas turbines, are customarily made with thermocouples having conductors sheathed in a cylindrical, metallic housing or sheath tightly packed with a refractory insulating powder or a substantially solid ceramic core. Such thermocouples are necessarily of the most rugged construction to avoid rapid deterioration under extreme vibration and temperature conditions. However, for speed of response to rapid variations in the measured temperature, the thermocouple junction of the thermoelements or dissimilar conductors usually extends beyond the end of the outer metallic housing through an opening in the end of that housing to be exposed to the gas or vapor under measurement. Thus, the insulating core may be exposed to fuel or water vapor during operation. The fuel may penetrate the core and be carbonized by subsequent rapid heating. Water vapor released by the combustion of the fuel may also be drawn into the insulating material of the core in the same manner and the result of the carbonization and hydration may be a harmful reduction of resistance between the conductors or between the sheath and the conductors. Various attempts have been made in the past to adequately seal the thermocouple. One such arrangement, to which the subject invention may be considered as being an improvement, is that disclosed in U.S. patent application, Ser. No. 715,013, filed February 13, 1958, now Patent No. 3,031,522, by Robert B. Clark and Laurence F. Perotte and assigned to the same assignee as the subject invention. That application may be referred to for additional description concerning the problems of carbonization and details of construction of thermocouples and spark plug connecting leads to which the present invention may be applied.

The carbonization or coking, which results from the fuel and water vapors being drawn into the core, reduces the resistance between the conductors and between the sheath and conductors causing spurious conductive paths and erroneous output readings.

A problem encountered in providing an insulating coating around the conductors or thermoelements is that coatings formed prior to the compacting of the insulating material which fills the space between the conductors and the sheath are usually broken during the compacting process, which process usually includes tamping followed by the swaging of the assembly.

It is an object of this invention to provide an improved sheathed conductor in the form of a thermocouple assembly, high voltage conductor or the like, which resists the effects of the diffusion therethrough of water vapor or carbonizable fuels.

It is a further object of this invention to increase the resistance between the thermoelements in a thermocouple.

It is a still further object of this invention to provide an improved sealed thermocouple having a relatively simple, yet efficient, thermoelement insulation suitable for operation at elevated temperatures under adverse conditions.

It is yet another object of this invention to provide an improved method of producing such an insulation coating.

Further objects and advantages of this invention will become apparent as the following description proceeds, and the features of novelty which characterize this invention will be pointed out with particularity in the claims annexed to and forming a part of this specification.

By way of summary, in accordance with one form of this invention the thermoelements or conductors of a sheathed thermocouple are coated with phosphoric acid and then inserted into the sheath. The insulating material is then added to fill the space between the conductors and the sheath and compacted to form an insulant about the thermoelements. The compacting may include subjecting the entire assembly to a swaging operation. The assembly is then fired at an elevated temperature to cause the formation of a phosphate coating about the conductors which provides an extremely high resistance coating from the reaction product of the phosphoric acid and the insulating material which is in intimate contact with the acid as a result of the swaging operation.

For a better understanding of this invention, reference may be had to the following description taken in combination with the accompanying drawings in which:

FIG. 1 is a block diagram illustrating a method of producing a sheath conductor assembly according to the present invention; and, FIG. 2 is a partly pictorial cross-sectional view of a thermocouple assembly which may be constructed according to the present invention.

FIG. 1 may be used as a ready reference guide to a quick comprehension of the steps involved in the production of sheathed conductors according to the present invention.

The thermoelements are first coated with a thin layer of phosphoric acid. The coating may be applied either by wiping the phosphoric acid onto the thermoelement wires or dipping the thermoelements into a vessel containing phosphoric acid. The thermoelements are then inserted into the metallic housing or sheath and the space between the thermoelement and the interior of the sheath filled with an insulating material such as MgO or $Al_2O_3$.

Alternatively, the insulating material may be added to the phosphoric acid prior to the placement of the thermoelements within the sheath 1. This can conveniently be accomplished by mixing a small amount of insulation and phosphoric acid to form a slurry prior to the coating step. Also, a small amount of insulating material may be applied to the phosphoric acid prior to placing the thermoelements within the sheath. Since the phosphoric acid coating is not brittle, but rather tacky or ductile, it is not damaged by the subsequent tamping or compacting procedures necessary to fill the insulating material and is unaffected by the swaging operation during the compacting of the particles. Swaging, as practiced in the art, comprises reducing the outside diameter of the sheath to force the particles of the insulating material into close contact with each other and the thermoelements.

After swaging, the thermocouple is subjected to a heat treatment or firing operation which may be 950° C. for fifteen to twenty minutes to drive off the excess phosphoric acid and form a thin, hard glaze insulation around the thermoelements. The glaze is the reaction product of the phosphoric acid with the insulating material. If the insulating material used is MgO, the reaction product formed is magnesium phosphate and if the insulating material is $Al_2O_3$, the reaction product formed is aluminum phosphate. The extremely high resistance insulation provided around the thermoelements resists the effects of coking of the insulating material through the action of fuel and water vapors and because of its thinness resists thermal shocks.

While the firing temperature required to provide the reaction between the insulating material and the phosphoric acid need only be as low as in the range of 350° C. to 400° C., more elevated temperatures may be used in order to simultaneously fire the insulating mass in accordance with prior art practices or in accordance with the teachings of the aforementioned Clark and Perotte patent application and to provide a harder coating while at the same time insuring that the excess phosphoric acid and water vapor are driven off. Excess vapors within the thermocouple can cause the rupture thereof during subsequent use at elevated temperatures.

Where a higher insulation resistance at high temperatures is required, it is preferable to use MgO as an insulating material. However, it has been found that $Al_2O_3$ is less abrasive than the MgO and will not deform the thermoelements during the swaging operation if the thermoelements are of soft material such as the noble metals.

Thus, the normal method of fabricating sealed thermocouples may be utilized including present compacting, swaging, and firing techniques and equipment, with a thin insulating coating being formed during the firing step because of the coating of phosphoric acid applied to the conductors prior to the assembly of the thermocouple or spark plug connecting lead. Since the phosphoric acid coating prior to the firing is ductile, the normal compacting and swaging operations will have no adverse effect on the insulating coating ultimately formed by the reaction of the phosphoric acid and the insulating material.

The thermocouple construction shown in FIG. 2 may be utilized in the practice of this invention. Referring to this figure, the tubular thermocouple sheath or housing 1 is shown installed by a mounting through an aperture in the wall 2 of a gas turbine power plant or any chamber containing a fluid whose temperature is under measurement. This mounting includes a nut 3 which is secured to the threaded flange 4 welded or brazed to the wall 2 in a gas tight relationship. Tubular sheath 1 may be made of stainless steel or other suitable material and a pair of thermoelements or dissimilar conductors 5 and 6 are supported with the sheath 1 and are welded or brazed to lead wires 7 and 8 which are in turn connected in circuit with a reference junction 9 to an indicating and/or control system shown in the drawing as milliammeter 10. In accordance with the subject invention, an insulating coating 11 is formed about the thermoelements 5 and 6 through the reaction product of a coating of phosphoric acid and the insulating material. The phosphoric acid coating is applied to the thermoelements prior to their placement within the sheath 1 and the insertion of the insulating material 12. The insulating material, which may comprise either MgO or $Al_2O_3$, is caused to completely fill the space between the thermoelements 5 and 6 and the sheath 1 through tamping followed by a swaging operation in a manner well known in the art. Such tamping and swaging has no adverse effect on the phosphoric acid which is still in a tacky or pliable form and subsequent firing of the thermocouple at an elevated temperature in excess of 350° C. will cause the hard glaze coating 11 to be formed about the thermoelements. It has been found that a greatly improved thermocouple suitable for use at elevated temperatures in the presence of fuel oil and water vapor is possible and that the subject invention may be utilized in combination with that disclosed in the aforesaid Clark and Perotte application to provide optimum thermocouple characteristics.

While MgO or $Al_2O_3$ are the preferred insulating materials, other compounds of Mg or Al such as carbonates may be used as well as compounds of calcium and zirconium.

Therefore, while particular embodiments of the subject invention have been shown and described herein, they are in the nature of description rather than limitation and it will occur to those skilled in the art that various changes, modifications, and combinations may be made within the province of the appended claims without departing either in spirit or scope from this invention in its broader aspects.

What I claim as new and desire to secure by Letters Patent of the United States is:

1. The method of providing a high resistance insulation coating for a conductor in a sheath comprising: coating the conductor with phosphoric acid, filling the space between the conductor and the sheath with a pulverized electrically insulating material, and firing the assembly at a temperature sufficient to provide a phosphate coating around said conductor as the reaction product of the phosphoric acid and the insulating material, said insulating material being of a composition which will react with phosphoric acid to form said phosphate coating.

2. The method of providing a high resistance insulation coating for a sheathed conductor comprising: coating the conductor with phosphoric acid, filling the space between the conductor and the sheath with a pulverized insulating material selected from the group consisting of compounds of Al, Mg, Ca and Zr, compacting the insulating material in said sheath, and firing the assembly at a temperature sufficient to provide a phosphate coating around said conductor as the reaction product of the phosphoric acid and the insulating material, said insulating material being of a composition which will react with phosphoric acid to form said phosphate coating.

3. The method of providing a high resistance insulation coating for a sheathed conductor comprising: coating the conductor with phosphoric acid, inserting the conductor within a hollow elongated sheath, filling the space between the conductor and the sheath with a pulverized electrically insulating heat conducting material selected from the group consisting of compounds of Al, Mg, Ca and Zr, compacting the insulating material in said sheath, and firing the assembly at a temperature sufficient to provide a phosphate coating around said conductor as the reaction product of the phosphoric acid and the insulating material, said insulating material being of a composition which will react with phosphoric acid to form said phosphate coating.

4. The method of providing a high resistance insulation coating for a sheathed conductor comprising: coating the conductor with phosphoric acid, inserting the conductor within a hollow elongated sheath, filling the space between the conductor and the sheath with a pulverized electrically insulating heat conducting material, compacting the insulating material in said sheath to bring the insulating material into intimate contact with said phosphoric acid coating, and firing the assembly at a temperature sufficient to provide a phosphate coating around said conductor as the reaction product of the phosphoric acid and the insulating material, said insulating material being of a composition which will react with phosphoric acid to form said phosphate coating.

5. The method of providing a high resistance insulation coating for a sheathed conductor comprising: coating the conductor with phosphoric acid, inserting the conductor within a hollow elongated sheath, filling the space between the conductor and the sheath with a pulverized electrically insulating heat conducting material of at least one other compound selected from the group consisting of Al, Mg, Ca and Zr mixed with a granular binding material, compacting the insulating material in said sheath to bring the particles of the insulating materials into intimate contact with each other and with said phosphoric acid coating, and firing the assembly at a temperature sufficient to bond said insulating and binding material and to provide a phosphate coating around said conductor as the reaction product of the phosphoric acid and the insulating material, said insulating material being of a composition which will react with phosphoric acid to form said phosphate coating.

6. The method of providing a high resistance insulation coating for a sheathed conductor comprising: coating the conductor with phosphoric acid and a pulverized electrically insulating heat conducting material, inserting the conductor within a hollow elongated sheath, filling the space between the coated conductor and the sheath with said electrically insulating heat conducting material, and firing the assembly at a temperature sufficient to provide a phosphate coating around said conductor as the reaction product of the phosphoric acid and the insulating material, said insulating material being of a composition which will react with phosphoric acid to form said phosphate coating.

References Cited in the file of this patent

UNITED STATES PATENTS 2,780,233     Comer _____ Jan. 20, 1959

FOREIGN PATENTS 513,030     Great Britain _____ 1939